(12) United States Patent
Kai

(10) Patent No.: US 7,648,161 B2
(45) Date of Patent: Jan. 19, 2010

(54) AIRBAG DEVICE

(75) Inventor: Takeshi Kai, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 266 days.

(21) Appl. No.: 11/787,738

(22) Filed: Apr. 17, 2007

(65) Prior Publication Data
US 2007/0246919 A1    Oct. 25, 2007

(30) Foreign Application Priority Data
Apr. 19, 2006  (JP) .......................... P 2006-115441
Apr. 19, 2006  (JP) .......................... P 2006-115442

(51) Int. Cl.
B60R 21/20 (2006.01)
(52) U.S. Cl. ............... 280/730.2; 280/743.1; 280/743.2
(58) Field of Classification Search ............. 280/730.1, 280/730.2, 743.1, 743.2
See application file for complete search history.

(56) References Cited
U.S. PATENT DOCUMENTS

| | | | | |
|---|---|---|---|---|
| 5,695,242 A | * | 12/1997 | Brantman et al. | 297/216.1 |
| 6,082,326 A | * | 7/2000 | Schietecatte et al. | 123/299 |
| 6,715,788 B2 | * | 4/2004 | Saiguchi et al. | 280/730.1 |
| 6,863,298 B2 | * | 3/2005 | Sakai et al. | 280/728.1 |
| 6,905,134 B2 | * | 6/2005 | Saiguchi et al. | 280/730.1 |
| 7,306,257 B2 | * | 12/2007 | Yoshikawa et al. | 280/728.2 |
| 7,322,604 B2 | * | 1/2008 | Itoga et al. | 280/733 |
| 7,377,544 B2 | * | 5/2008 | Itoga | 280/733 |
| 7,452,030 B2 | * | 11/2008 | Yoshikawa et al. | 297/216.1 |
| 7,481,452 B2 | * | 1/2009 | Itoga et al. | 280/733 |
| 2004/0178616 A1 | * | 9/2004 | Yoshikawa | 280/748 |
| 2007/0090633 A1 | * | 4/2007 | Hiruta et al. | 280/730.1 |

FOREIGN PATENT DOCUMENTS

JP    2004-359207    12/2004
JP    2005-126051    5/2005

* cited by examiner

*Primary Examiner*—Toan C To
(74) *Attorney, Agent, or Firm*—Carrier, Blackman & Associates P.C.; Joseph P. Carrier; William D. Blackman

(57) ABSTRACT

An airbag device, provided below a pad of a vehicle seat cushion, comprises an airbag which deploys at a time of a vehicle collision, and an enveloping member which envelops the airbag in a tube shape; the airbag device is characterized in being provided at a position substantially in a center of the seat cushion in the back-and-forth direction of the vehicle, and in that the enveloping member has different peripheral lengths in an intermediate portion thereof and in end portions thereof.

4 Claims, 14 Drawing Sheets

AIRBAG DEVICE

BACKGROUND OF THE INVENTION

1. Field of the Invention

This invention relates to an airbag device, provided below the pad of a seat cushion in a vehicle, which deploys upwards at the time of a vehicle collision to restrain the forward motion of an occupant.

Priority is claimed on Japanese Patent Application No. 2006-115441, filed on Apr. 19, 2006, and Japanese Patent Application No. 2006-115442, filed on Apr. 19, 2006, the content of which is incorporated herein by reference.

2. Description of Related Art

Among airbag devices having a bag (airbag) which deploys at the time of a vehicle collision are devices in which a bag is provided below the pad of a vehicle seat cushion, and which cause the pad to be distended by upward deployment thereof, to restrain forward motion of the pelvis of an occupant. Among such airbag devices are devices which control the deployed shape of the bag by means of an enveloping member (see for example Japanese Unexamined Patent Application, First Publication No. 2004-359207). Such an airbag device causes the enveloping member to envelop the bag with a fixed peripheral length.

However, because the above-described enveloping member envelops the bag with a fixed peripheral length, the deployed shape of the bag can only be constrained to a cylindrical shape.

Furthermore, an airbag device which restrains forward motion of the pelvis of an occupant has a structure in which the airbag is provided within a depressed area formed in the seat pan, and a cover is mounted on the seat pan so as to cover the depressed area (see for example Japanese Unexamined Patent Application, First Publication No. 2005-126051).

However, on occasion an occupant may spill a beverage or other liquid onto the vehicle seat. In such cases, when an airbag device with the above-described structure is installed, the liquid, having penetrated the pad of the seat cushion, may travel along the seat pan and enter the depressed area from the gap between the cover and seat pan by means of capillary action, and may result in inundation up to the airbag.

SUMMARY OF THE INVENTION

Hence a first object of the present invention is to provide an airbag device for which the deployed shape of the bag can be set to an arbitrary shape other than a cylindrical shape.

A second object of the present invention is to provide an airbag device for which inundation up to the airbag with liquid which has penetrated the pad of the seat cushion can be prevented.

In order to attain the above objects, an airbag device according to the present invention, provided below a pad of a vehicle seat cushion, comprises an airbag, which is deployed at a time of a vehicle collision, and an enveloping member, which envelops the airbag in a tube shape, and is characterized in that the airbag device is provided in a position substantially in the center of the seat cushion in the back-and-forth direction of the vehicle, and the enveloping member has different peripheral lengths in an intermediate portion thereof and in end portions thereof Thus because the enveloping member which encompasses the airbag which deploys in the event of a vehicle collision has peripheral lengths which are different in the intermediate portion and in the end portions, the deployed shape of the airbag can be set to an arbitrary shape other than a cylindrical shape.

Further, a constitution may be employed is possible in which the enveloping member is such that the peripheral length at the end portions is longer than the peripheral length in the intermediate portion.

According to this constitution, the peripheral length at the end portions is longer than the peripheral length in the intermediate portions of the enveloping member, so that the airbag deploys such that both end portions are larger than the intermediate portion, and so at the time of forward motion of the pelvis of the occupant, the base portion of both thighs can be effectively restrained.

Also, the airbag device may be constituted to further have a case, having an opening portion in an upper portion, to accommodate the airbag, and a cover member, which covers the opening portion of the case.

Also, a constitution may be employed in which the peripheral portion of the cover member is positioned on the opening periphery of the opening portion of the case and extends further outward than the opening portion periphery, and in which the end peripheral portion positioned on an outside of the opening periphery is bent downward.

According to this constitution, the peripheral portion of the cover member which covers the opening in the upper portion of the case accommodating the airbag rests on the opening peripheral portion of the upper portion of the case, and extends outward beyond this opening peripheral portion, and moreover the end peripheral portion positioned on the outside of this opening peripheral portion is bent downwards, so that liquid which has passed through the pad of the seat cushion is stopped by the downward-bent end peripheral portion, impeding inundation in the gap between the case and the cover member. Hence inundation up to the airbag by liquid which has passed through the seat cushion pad can be prevented.

In addition, the edge portion may be placed remote from the opening peripheral portion.

According to this constitution, the edge portion, bent below the peripheral portion of the cover member, is placed at a distance from the opening peripheral portion of the case, so that inundation in the gap between the case and the cover member can be reliably impeded. Hence inundation of the airbag by liquid which has passed through the seat cushion pad can be more reliably prevented.

DETAILED DESCRIPTION OF THE INVENTION

Figure 1:
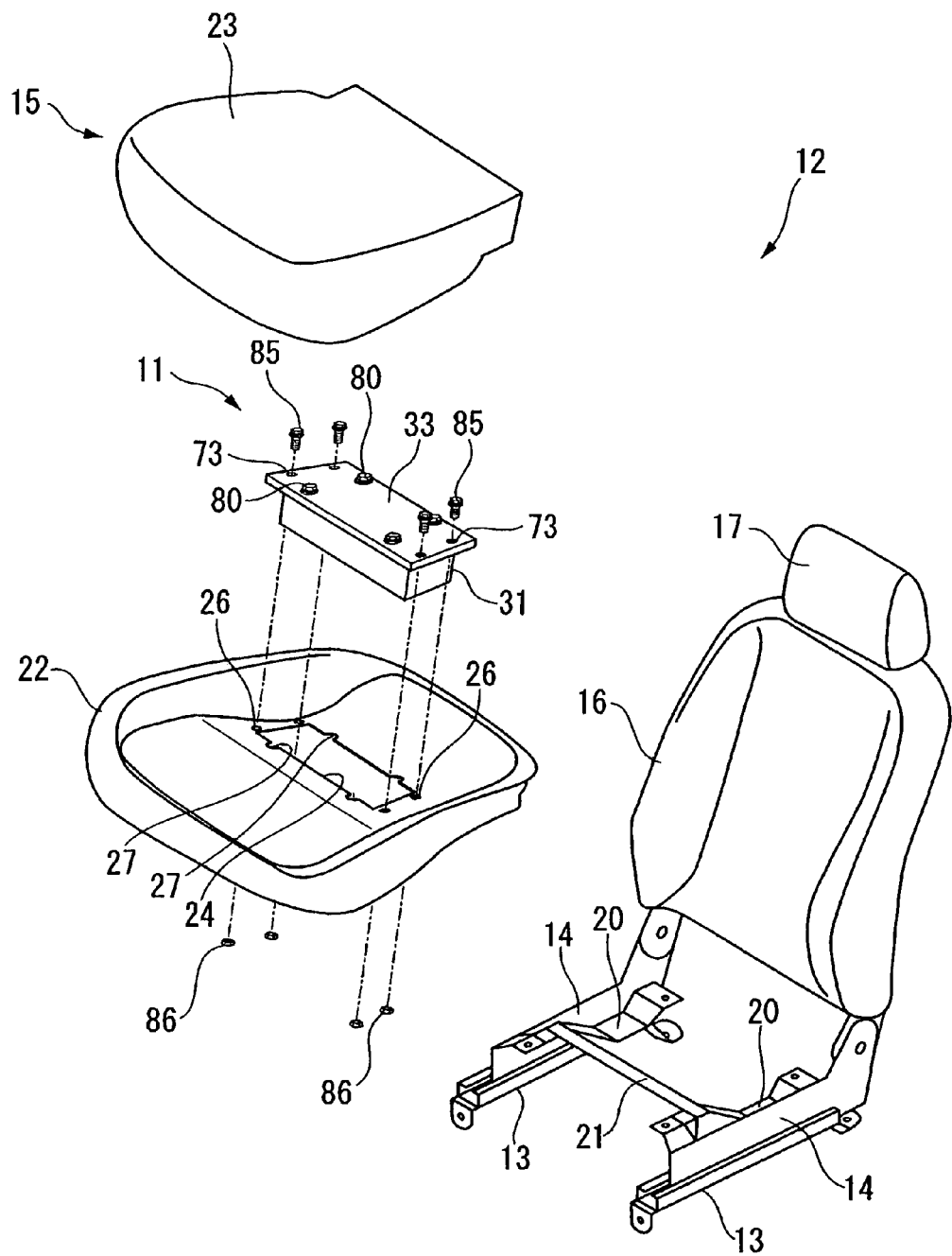
FIG. 1 is an exploded perspective view showing a seat to which the airbag device of a first embodiment of the present invention is applied.

Embodiments of an airbag device of the present invention are explained below, referring to the drawings.

First Embodiment

To begin with, the airbag device of a first embodiment of the present invention is explained below, referring to FIG. 1 through FIG. 7.

FIG. 1 is an exploded perspective view showing a vehicle seat 12, in which an airbag module 11 is installed as the airbag device of the first embodiment. This seat 12 has a pair of seat rails 13, extending in the back-and-forth direction of the vehicle, provided at a distance from each other in the vehicle width direction; sliders 14, slidably provided on each of the seat rails 13; a seat cushion 15, supported by the sliders 14, positioned substantially horizontally, to support primarily the posterior of the occupant; a seat back 16, provided rotatably on the rearward portion in the vehicle back-and-forth direction of the sliders 14, to support primarily the back of the occupant in the erect state; and, a headrest 17, provided on the side of the seat back 16 opposite the seat cushion 15, to support primarily the back of the head of the occupant.

The seat cushion 15 has pan brackets 20, each fixed to the inside of a slider 14; a connecting bracket 21, extending in the vehicle width direction so as to connect the right and left pan brackets 20; a seat pan 22, resting on the upper sides of both pan brackets 20 and fixed to both pan brackets 20; and a cushion pad (pad) 23, resting on the upper side of the seat pan 22 and supported by the seat pan 22. The occupant sits upon the cushion pad 23, which is formed by covering urethane foam with a membrane.

Figure 2:
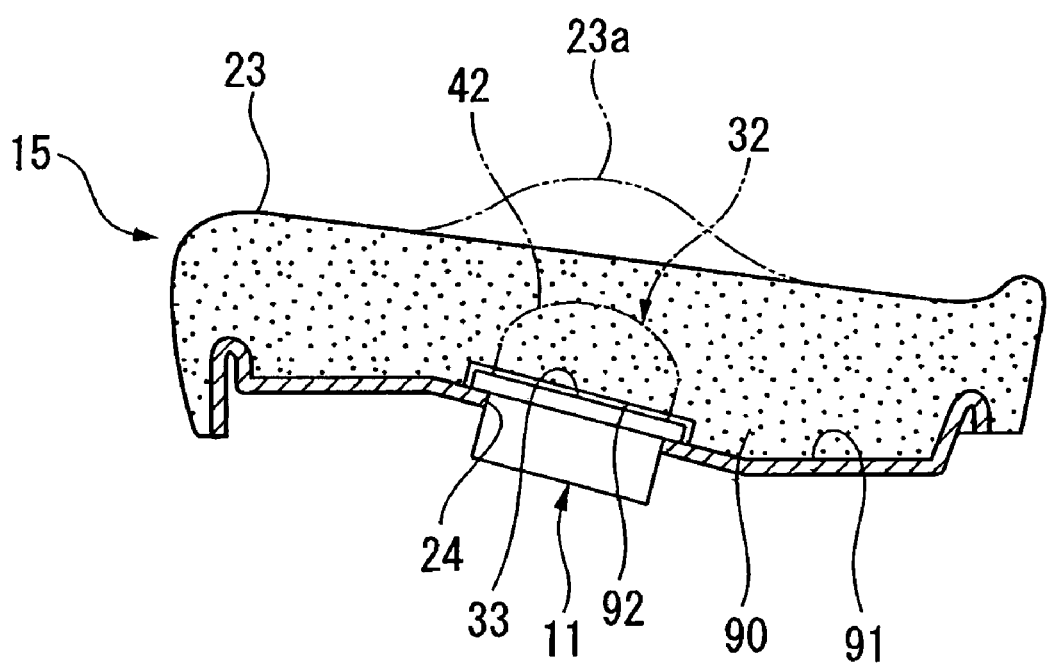
FIG. 2 is a side cross-sectional view showing a seat cushion to which the airbag device of the first embodiment of the present invention is applied.

As shown in FIG. 2 also, the airbag module 11 of this embodiment is installed at a prescribed midpoint position on the seat pan 22 supporting the cushion pad 23 in the seat cushion 15. Here, a "prescribed midpoint position" is a position substantially in the center of the seat cushion 15 in the back-and-forth direction of the vehicle. As a result, the airbag module 11 is positioned below the cushion pad 23 of the seat cushion 15. At the prescribed midpoint position of the seat pad 22, a mounting opening portion 24 for mounting of the airbag module 11 is formed. And as shown in FIG. 1, on the outside of the installation opening portion 24 are formed mounting holes 25 for the airbag module 11. In addition, clearance grooves 27 for mounting of the airbag module 11 are formed in the mounting opening portion 24.

Figure 3:
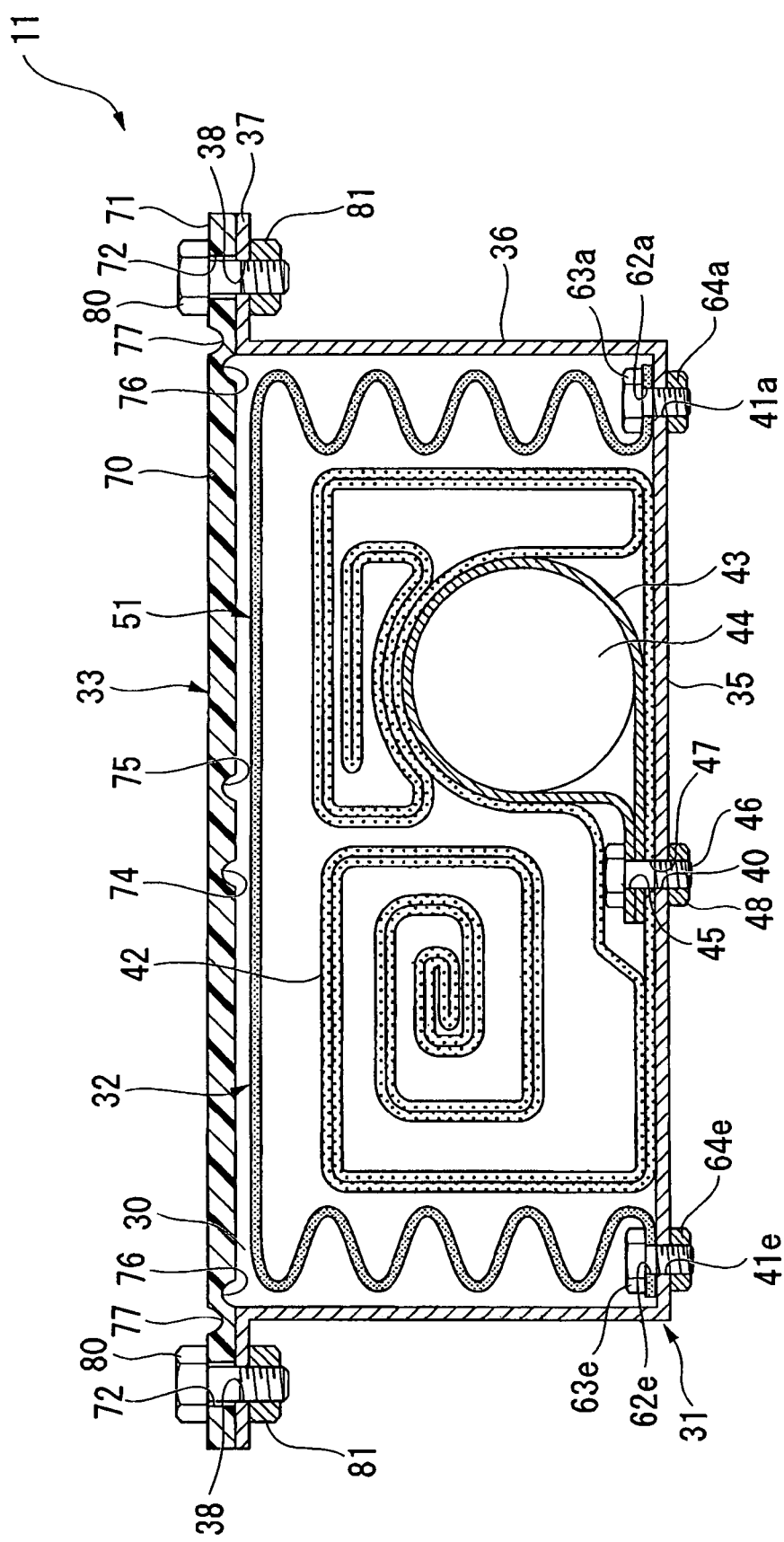
FIG. 3 is a side cross-sectional view of the airbag device of the first embodiment of the present invention.

As shown in FIG. 3, the airbag module 11 comprises a closed-bottom box-shape case 31 having an opening portion 30 in the upper portion; an airbag 32 accommodated, in a folded state, within this case 31; and a cover member 33 which covers the opening portion 30 of the case 31.

Figure 4:
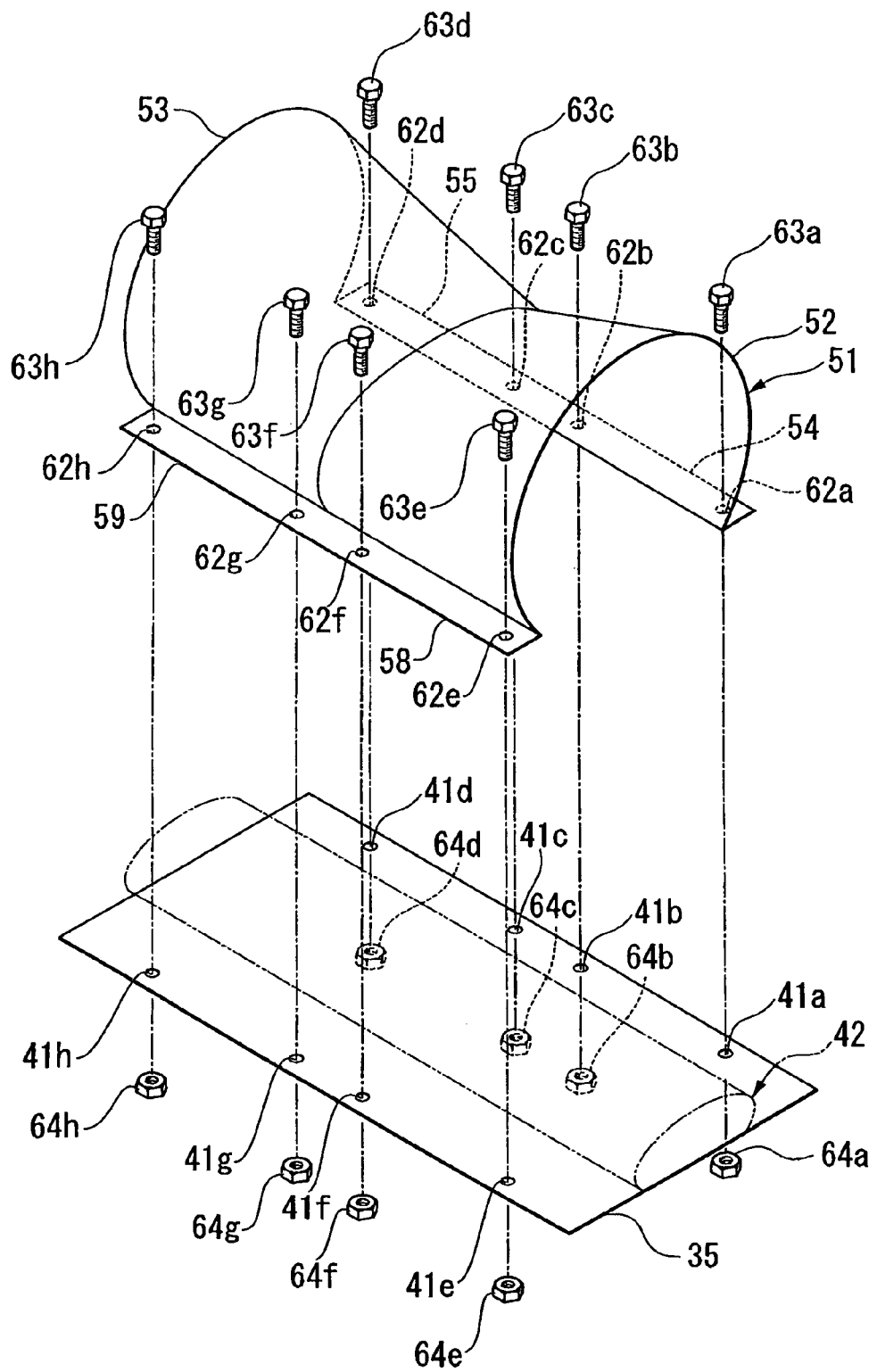
FIG. 4 is an exploded perspective view showing the bag, before deployment, of the airbag device of the first embodiment of the present invention.

The case 31 is formed from a metal, and has a base plate portion 35, of substantially rectangular shape, longer in the transverse direction; a peripheral-wall portion 36, in a square-tube shape, standing erect from the entire periphery of the base plate portion 35; and a flange portion 37, extending outward from the entire periphery of the upper-end portion of the periphery-wall portion 36, and forming an opening peripheral portion. A plurality of mounting holes 38 for mounting the cover member 33 are formed in the flange portion 37. Also, a plurality of mounting holes (not shown) for mounting on the seat pan 22 are formed. In the base plate portion 35 are formed a plurality of mounting holes 40 for mounting the airbag 32, a plurality of (specifically, four) mounting holes 41a to 41d positioned in a straight line in the length direction on one side of the base plate portion 35, as shown in FIG. 4, and a plurality of (specifically, four) mounting holes 41e to 41h positioned in a straight line in the length direction on the opposite side of the base plate portion 35.

As shown in FIG. 3, the airbag 32 has a bag 42, of cloth, in a bag shape which is long in the width direction, and an inflator 44, placed within the bag 42 in a state of being held by a mounting bracket 43, in a substantially tubular shape and able to introduce gas (a fluid) into the bag 42. Here, the mounting bracket 43 is fixed by welding or similar to a bolt 46 in a mounting hole 45 formed therein. This bolt 46 is inserted into a mounting hole 40 of the base plate portion 35 of the case 31, in a state of insertion into the mounting hole 47 formed in the bag 42. And, a nut 48 is screwed onto the tip thereof, to mount the bag 42 onto the case 31.

The airbag 32 of the first embodiment has an enveloping member 51, of cloth, provided so as to encompass the bag 42. This enveloping member 51, when in a state of being deployed on a flat surface prior to enveloping the bag 42, has the shape shown in FIG. 5. That is, the enveloping member 51 is such that the edge portion 52 on one end in the length direction and the edge portion on the other end 53 in the length direction are the same length and parallel, and their positions are in agreement. And, an edge portion 54 extends, from one end of the edge portion 52 to the side of the other edge portion 53 making a prescribed acute angle with the edge portion 52. And, an edge portion 55 extends to the side of the edge portion 52, from one end of the edge portion 53 on the wide nearer the one end of the edge portion 52, making the same prescribed acute angle with the edge portion 53. The tip portions of these edge portions 54, 55 intersect, forming a base-angle portion 56. An edge 58 also extends from the other end of the edge portion 42 to the side of the other edge portion 53, forming the same prescribed acute angle with the edge portion 52. And an edge portion 59 also extends from the other end of the edge portion 53 to the side of the edge portion 52, forming the same prescribed acute angle with the edge portion 53. The tip portions of these edge portions 58, 59 intersect, forming a base-angle portion 60. In this way, the enveloping member 51 has edge portions 52, 53 on both ends, the lengths of which are longer than the length in the center portion (midpoint portion) joining the base-angle portion 56 formed by the edge portions 54, 55 with the base-angle portion 60 formed by the edge portions 58, 59.

A mounting hole 62a is formed at an inside position of the edge portion 54 on the side of the edge portion 52, at a prescribed distance from edge portion 54. A mounting hole 62b is also formed at an inside position of edge portion 54 on the side of base-angle portion 56, at the same prescribed distance from edge portion 54. And, a mounting hole 62c is formed at an inside position of edge portion 55 on the side of base-angle portion 56, at the same prescribed distance from edge 55, Further, a mounting hole 62d is formed at an inside position of edge portion 55 on the side of edge portion 53, at the same prescribed distance from edge portion 55. Further, a mounting hole 62e is formed at an inside position of edge portion 58 on the side of edge portion 52, at a prescribed distance from edge portion 58. Further, a mounting hole 62f is formed at an inside position of edge portion 58 on the side of base-angle portion 60, at the same prescribed distance from edge portion 58. And, a mounting hole 62g is formed at an inside position of edge portion 59 on the side of base-angle portion 60, at the same prescribed distance from edge portion 59. Further, a mounting hole 62h is formed at an inside position of edge portion 59 on the side of edge portion 53, at the same prescribed distance from edge portion 59.

As shown in FIG. 4, the edge portions 54, 55 on one side of the enveloping member 51 are mounted in a straight line on the base plate portion 35. That is, bolts are passed through the mounting holes 41a to 41d arranged in a straight line on one side of the base plate portion 35, and nuts are screwed thereonto. Specifically, a bolt 63a is passed through the mounting hole 41a and mounting hole 62a, and a nut 64a is screwed onto this bolt 63a. And, a bolt 63b is passed through the mounting hole 41b and mounting hole 62b, and a nut 64b is screwed onto this bolt 63b. And, a bolt 63c is passed through the mounting hole 41c and mounting hole 62c, and a nut 64c is screwed onto this bolt 63c. And, a bolt 63d is passed through the mounting hole 41d and mounting hole 62d, and a nut 64d is screwed onto this bolt 63d. By this means, the edge portions 54, 55 on one side of the enveloping member 51 are mounted in a straight line onto the base plate portion 35.

Further, the edge portions 58, 59 on the other side of the enveloping member 51 are mounted in a straight line on the base plate portion 35. That is, bolts are passed through the mounting holes 41e to 41h arranged in a straight line on one side of the base plate portion 35, and nuts are screwed thereonto. Specifically, a bolt 63e is passed through the mounting hole 41e and mounting hole 62e, and a nut 64e is screwed onto this bolt 63e. And, a bolt 63f is passed through the mounting hole 41f and mounting hole 62f, and a nut 64f is screwed onto this bolt 63f. And, a bolt 63g is passed through the mounting hole 41g and mounting hole 62g, and a nut 64g is screwed onto this bolt 63g. And, a bolt 63h is passed through the mounting hole 41h and mounting hole 62h, and a nut 64h is screwed onto this bolt 63h. By this means, the edge portions 58, 59 on one side of the enveloping member 51 are mounted in a straight line onto the base plate portion 35. Here, with the enveloping member 51 mounted in this way on the base plate portion 35, the bag 42 is in a state of protruding by substantially the same length from both ends of the enveloping member 51.

As shown in FIG. 3, the cover member 33 is of synthetic resin, and with the intermediate cover portion 70 covering the opening portion 30 of the case 31, the entire peripheral portion 71 on the outside of this cover portion 70, that is, on the outside of the opening portion 30, resists on the entire periphery of the flange portion 37.

Mounting holes 72 are formed in the cover member 33, positioned corresponding to the mounting holes 38 in the flange portion 37 of the case 31. Further, the mounting holes 73 shown in FIG. 1 are formed in positions corresponding to mounting holes (not shown) for mounting of the flange portion 37 onto the seat pan 22. On the inner face of the cover member 33 on the side of the case 31 near the center are formed, in parallel, a plurality of tear lines 74, 75 where the material is thin to promote rupture at the time of deployment of the airbag 32. In addition, a pair of bending lines 76 where the material is thin are formed in the cover member 33 on the inner face, in parallel with the tear lines 74, 75 in proximity to the border with the flange portion 37, to facilitate bending. Similar bending lines 77 are formed on the outer face. In order to facilitate bending outward, the outer-face bending lines 77 are formed somewhat further outside than the inner-face bending lines 76 in proximity thereto.

The cover member 33 is fixed to the case 31 by bolts 80 which pass through each of the plurality of mounting holes 72 and the plurality of mounting holes 38 formed in the flange portion 37 of the case 31, and by nuts 81. That is, bolts 80 are passed through the mounting holes 72 in the cover member 33 and mounting holes 38 in the case 31, and nuts 81 are screwed thereonto. By this means, the cover member 33 is fixed to the case 31.

In this way, the airbag 32, comprising an inflator 33, mounting bracket 43, bag 42, and enveloping member 51, is accommodated in the case 31, into which the cover member 33 is mounted, to form the airbag module 11. The peripheral wall portion 36 of the case 31 of this airbag module 11 is inserted from the upper side into the mounting opening portion 24 of the seat pan 22. And, the flange portion 37 of the case 31 rests on the peripheral portion of the mounting opening portion 24 of the seat pan 22. At this time, bolts 80 and nuts 81 are inserted into the clearance grooves 27. In this state, the bolts 85 pass through the plurality of remaining mounting holes 73 in the cover member 33, the plurality of remaining mounting holes (not shown) in the case 31, and the outside mounting holes 26 of the mounting opening portion 24. By means of these bolts 85 and nuts 86, the airbag module 11 is fixed to the seat pan 22. That is, the bolts 85 are passed through the mounting holes 73 in the cover member 33, the mounting holes (not shown) in the case 31, and the mounting holes 26 in the seat pan 22, and nuts 86 are screwed thereonto, to fix the airbag module 11 onto the seat pan 22.

Onto the seat pan 22, with the airbag module 11 mounted in this way, is mounted the cushion pad 23 shown in FIG. 2 so as to cover the seat pan 22 from above. An accommodating depression portion 92 is formed in the lower face of the cushion pad 12, in order to accommodate the portion of the airbag module 11 protruding from the seat pan 22, that is, the cover member 33, in a state of contact with the peripheral portion 91 of the airbag module 11 further outside the seat pan 22 in the peripheral-side peripheral portion 90.

Figure 6:
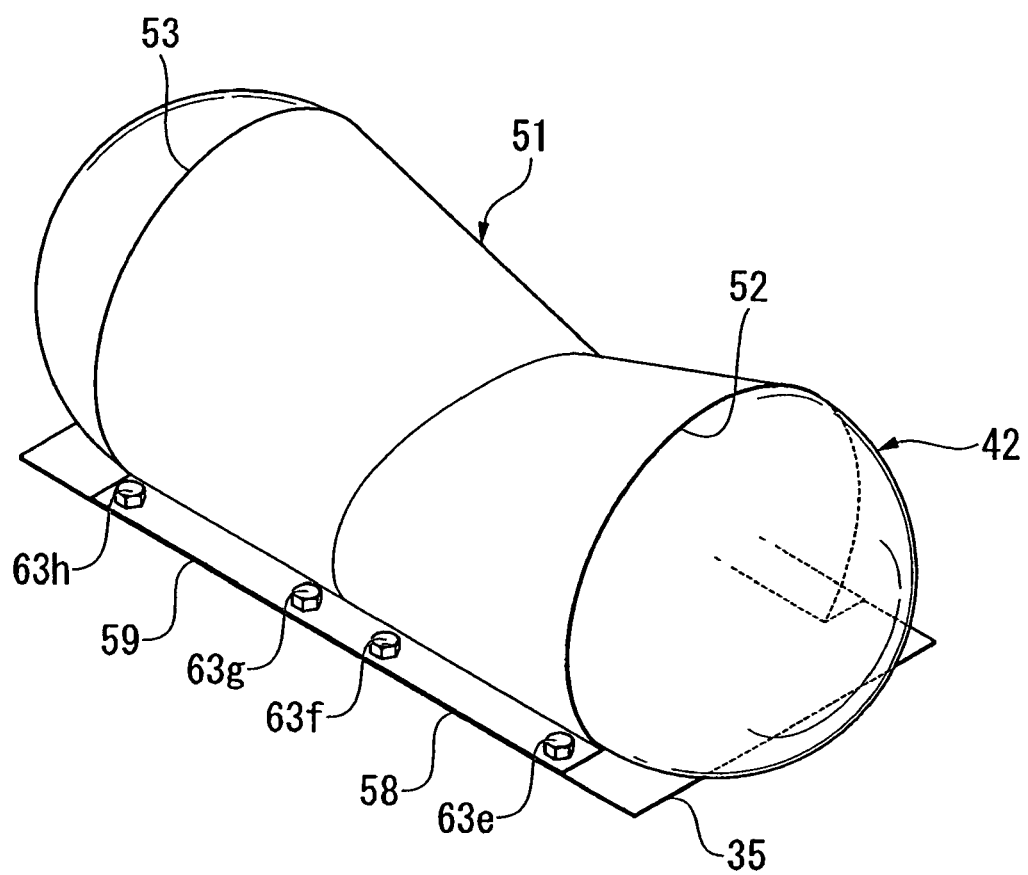
FIG. 6 is a perspective view showing deployment of the bag of the airbag device of the first embodiment of the present invention.
Figure 7:
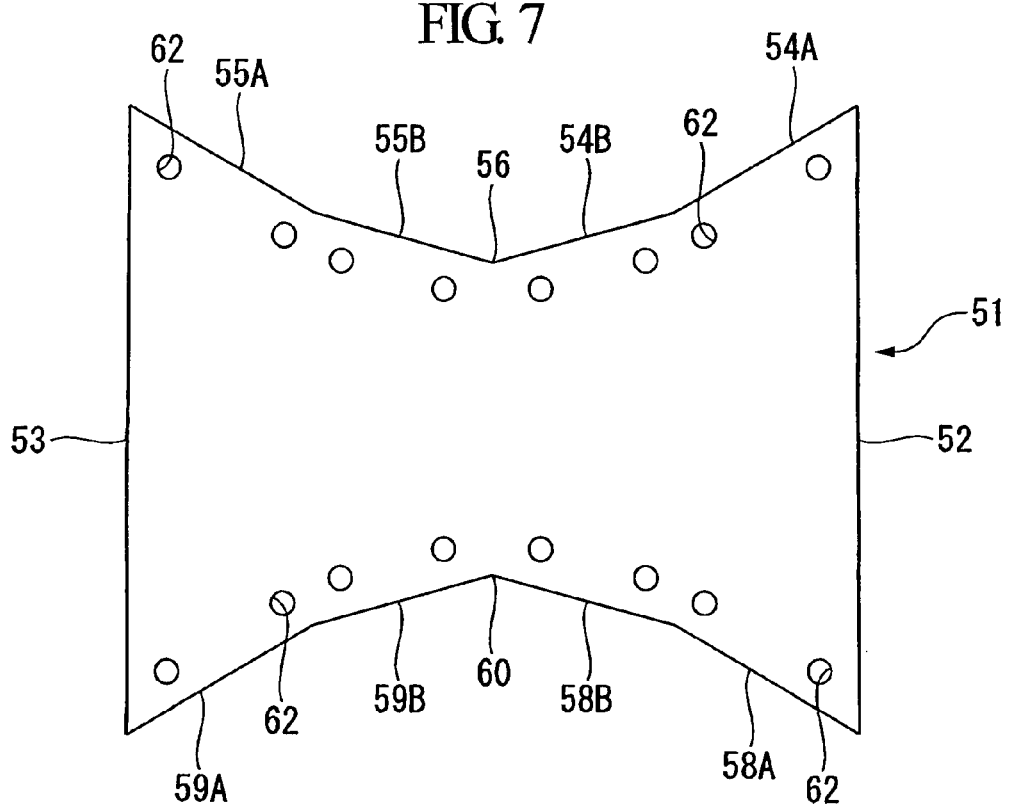
FIG. 7 is a plan view showing a modified example of the enveloping member of the airbag device of the first embodiment of the present invention.

In the airbag module 11 of the above first embodiment, when in the event of a vehicle collision, such as for example detection of gravitational acceleration equal to or above a prescribed value, or when other conditions for deployment are met, the inflator 44 is ignited. The bag 42, which had been in a folded state, then deploys due to gas generated from the inflator 44. At this time, the cover member 44 is torn from the tear lines 74, 75, and by bending at the bending lines 76, 77 on both sides, the bag 42 deploys upward while pressing the cover member 33 outward on the outsides. As indicated by the dot-dash line in FIG. 2, the cushion pad 23 is then pressed upward. Then the midpoint position of the cushion pad 23 is distended upward, forming a distended portion 23a. Hence the posterior of the occupant, seated in the seat 12 and with the seatbelt fastened, is checked from the front side, and forward motion of the pelvis is restrained. Here, the enveloping member 51 such that the edge portions 52, 53 on both ends form a longer shape than the distance connecting the base-angle portions 56, 60 at the center. Hence the peripheral lengths of the center portion and the end portions are different. Specifically, the peripheral lengths of the end portions are longer than the peripheral length of the center portion. Hence as shown in FIG. 6, the deployed shape of the bag 42 is constrained by the enveloping member 51, and so both end portions deploy to larger sizes than the center portion.

According to the above-described first embodiment, the enveloping member 51, which envelops the bag 42 deployed in the event of a vehicle collision, has different peripheral lengths at the center portion and at both end portions. Hence the deployed shape of the bag 42 can be set to an arbitrary shape other than cylindrical. Specifically, the peripheral lengths at the positions of the edge portions 52, 53 at both ends are longer than the peripheral length at the position connecting the base-angle portions 56, 60 in the center portion of the enveloping member 51. Consequently, as shown in FIG. 6, the bag 42 deploys into substantially a dumbbell shape, with both end portions larger than the center portion. Hence at the time of forward motion of the pelvis of the occupant, the base portion of both thighs can be effectively restrained. Thus the enveloping member 51 can be used to control the deployed shape of the bag 42 to a shape which is preferable for restring forward motion of the pelvis of the occupant, and the occupant can be restrained satisfactorily.

Figure 5:
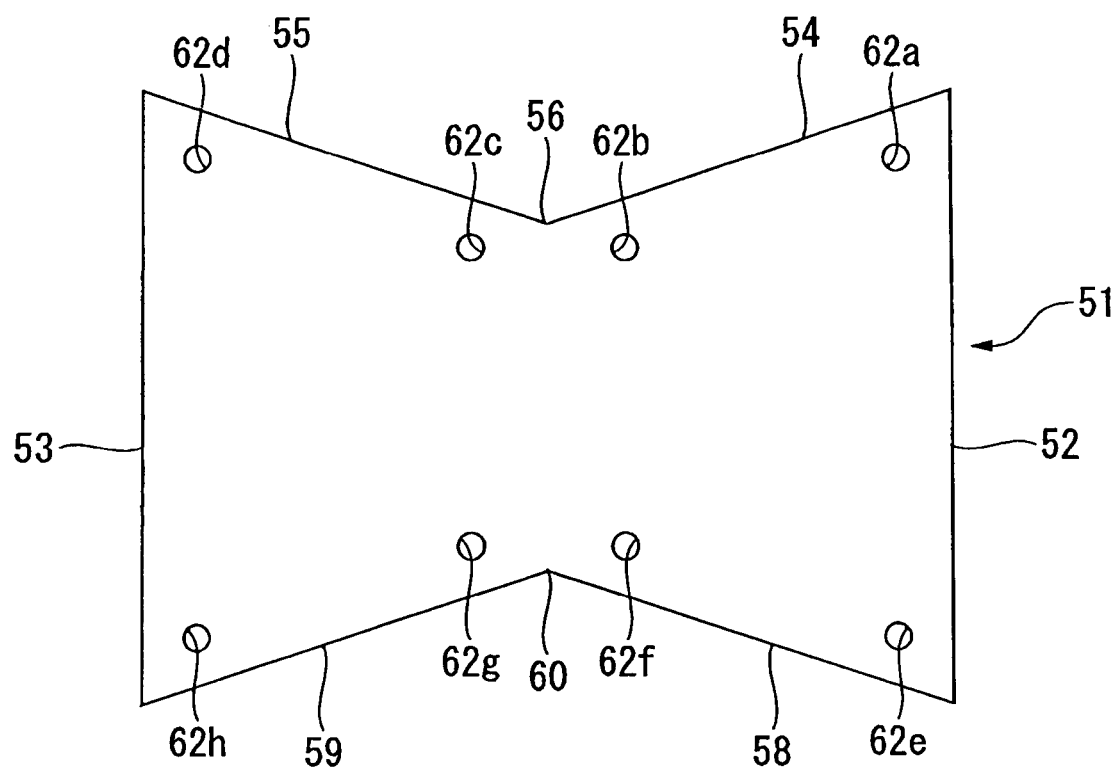
FIG. 5 is a plan view of the enveloping member of the airbag device of the first embodiment of the present invention.

In the above-described first embodiment, as shown in FIG. 5, an example was explained in which one straight-line edge portion 54 is extended from one end of one edge portion 52 toward the base-angle portion 56, one straight-line edge portion 55 is extended from one end of the other edge portion 53 toward the base-angle portion 56, one straight-line edge portion 58 is extended from the other end of the one edge portion 52 toward the base-angle portion 60, and one straight-line edge portion 59 is extended from the other end of the other edge portion 53 toward the base-angle portion 60. However, this invention is not limited to such a constitution. For example, the constitution shown in FIG. 7 may be used. In this example, a plurality of (specifically, two) straight-line edge portions 54A, 54B are extended from one end of one edge portion 52 toward the base-angle portion 56, with the angle with the edge portion 52 increased in steps. And, a plurality of (specifically, two) straight-line edge portions 55A, 55B are extended from one end of the other edge portion 53 toward the base-angle portion 56, with the angle with the edge portion 53 increased in steps. And, a plurality of (specifically, two) straight-line edge portions 58A, 58B are extended from the other end of one edge portion 52 toward the base-angle portion 60, with the angle with the edge portion 52 increased in steps. And, a plurality of (specifically, two) straight-line edge portions 59A, 59B are extended from the other end of the other edge portion 53 toward the base-angle portion 60, with the angle with the edge portion 53 increased in steps. In this case, mounting holes 62 are formed on both sides of each of the edge portions 54A, 54B, 55A, 55B, 58A, 58B, 59A, 59B, and mounting holes are also formed in accordance with these in the base plate portion 35 of the case 51. By means of such a constitution, the bag 42 assumes a deployed shape such that the diameter is reduced in a plurality of tapered steps from the end portions toward the center portion.

Second Embodiment

Next, the airbag device of a second embodiment of the present invention is explained, referring mainly to FIG. 8 through FIG. 11. In this embodiment, an explanation is given primarily of points of difference with the above first embodiment. Hence constituent elements which are similar to those in the first embodiment are assigned the same symbols, and detailed explanations are omitted.

In the airbag device of the second embodiment, the cloth enveloping member differs from that of the airbag device of the above first embodiment. That is, the enveloping member 101 of the second embodiment forms the shape shown in FIG. 8 when in the state of being laid on a flat surface, prior to enveloping the bag 42. In the enveloping member 101, the edge portion 102 on one end in the length direction is parallel to and the same length as another edge portion 102 in the length direction, and the positions thereof are aligned. And, an edge portion 104 extends from one end of the edge portion 102, making a prescribed obtuse angle with the edge portion 102, to the side of the other edge portion 103. Also, an edge portion 105 extends from one end of the edge portion 103 on the side near the one end of the edge portion 102, making the same prescribed obtuse angle with the edge portion 103, to the side of edge portion 102. The tip portions of these edge portions 104, 105 intersect, forming a vertex-angle portion 106. An edge portion 108 also extends from the other end of the edge portion 102, forming the same prescribed obtuse angle with edge portion 102, to the side of the other edge portion 103. And an edge portion 109 also extends from the other end of edge portion 103, forming the same prescribed obtuse angle with edge portion 103, to the side of edge portion 102. The tip portions of these edge portions 108, 109 intersect, forming a vertex-angle portion 110. By means of the above, in the enveloping member 101, the lengths of the edge portions 102, 103 at both ends are shorter than the length of the center portion (intermediate portion) connecting the vertex-angle portion 106, formed by the edge portions 104 and 105, with the vertex-angle portion 110, formed by the edge portions 108 and 109.

A mounting hole 112a is formed at an inside position of the edge portion 104 on the side of edge portion 102, at a prescribed distance from edge portion 104. A mounting hole 112b is also formed at an inside position of the edge portion 104 on the side of vertex-angle portion 106, at the same prescribed distance from edge portion 104. A mounting hole 112c is also formed at an inside position of the edge portion 105 on the side of the vertex-angle portion 106, at the same prescribed distance from edge portion 105. A mounting hole 112d is also formed at an inside position of the edge portion 105 on the side of edge portion 103, the same prescribed distance from edge portion 105. A mounting hole 112e is also formed at an inside position of the edge portion 108 on the side of edge portion 102, the same prescribed distance from edge portion 108. A mounting hole 112f is also formed at an inside position of the edge portion 108 on the side of the vertex-angle portion 110, at the same prescribed distance from edge portion 108. A mounting hole 112g is also formed at an inside position of the edge portion 109 on the side of the vertex-angle portion 110, at the same prescribed distance from edge portion 109. And, a mounting hole 112h is also formed at an inside position of the edge portion 109 on the side of edge portion 103, the same prescribed distance from edge portion 109.

Figure 9:
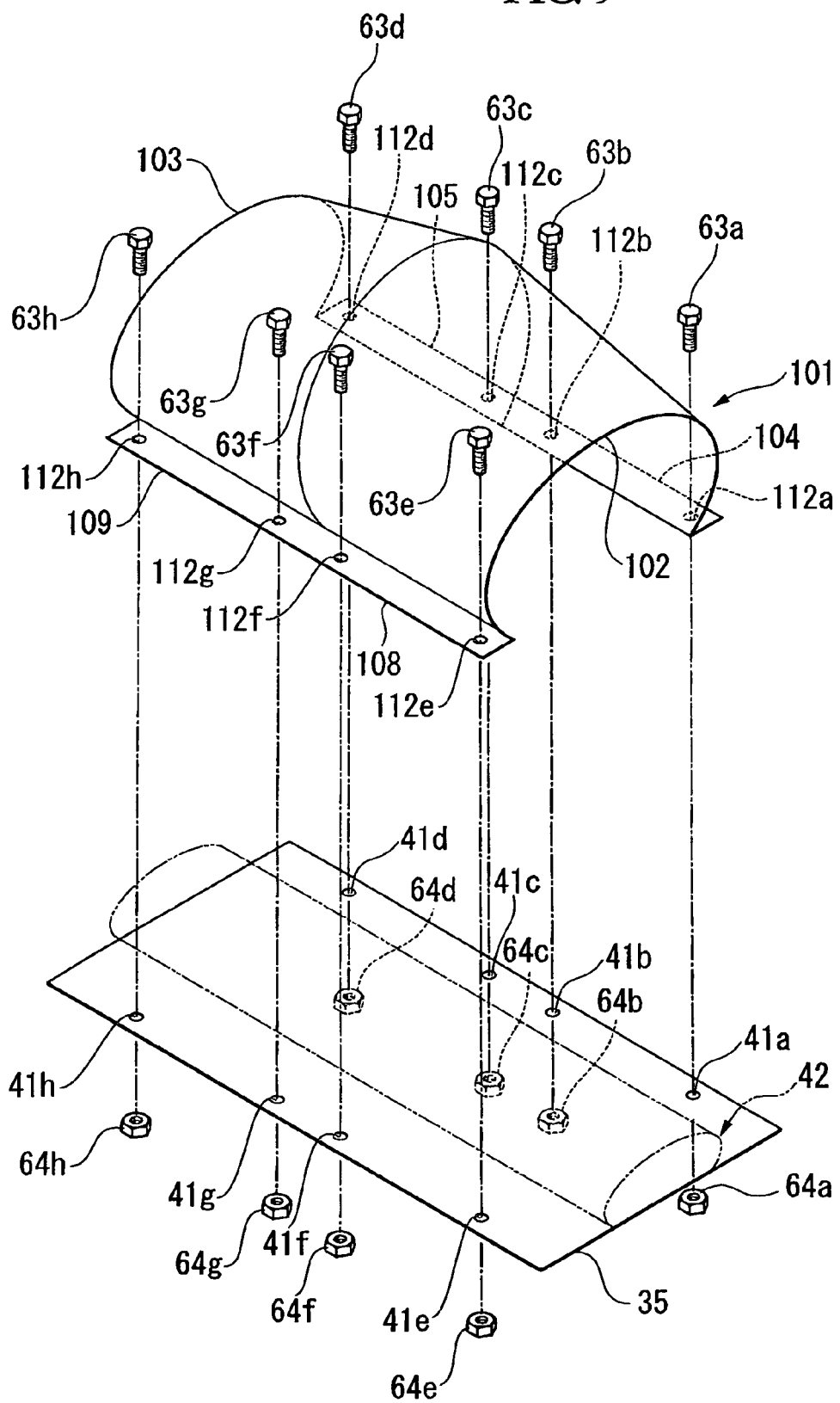
FIG. 9 is an exploded perspective view showing the bag, before deployment, of the airbag device of the second embodiment of the present invention.
Figure 10:
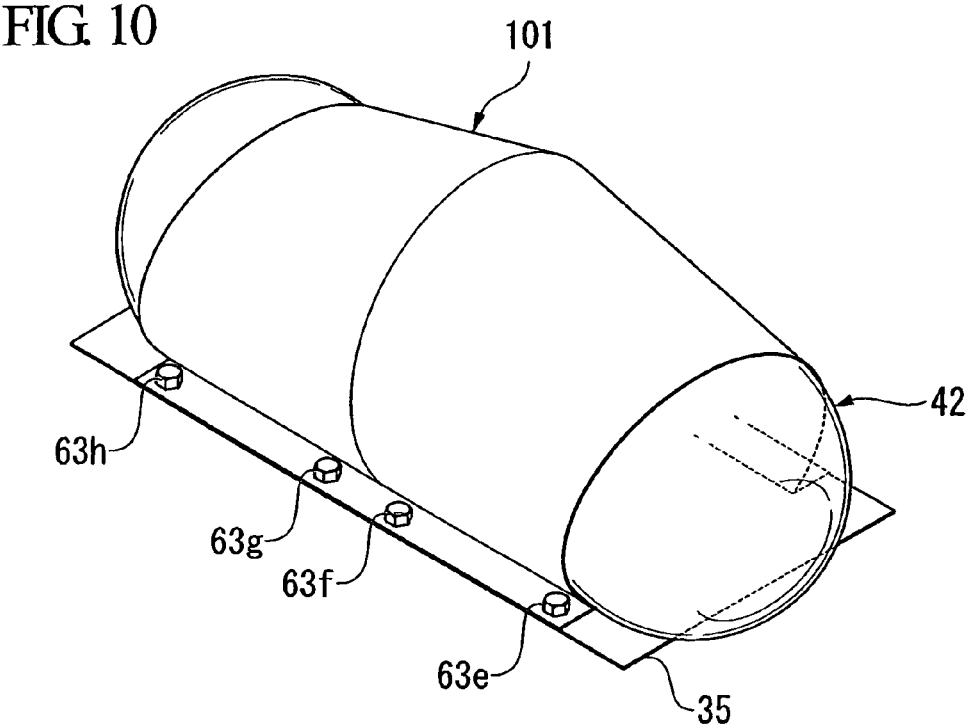
FIG. 10 is a perspective view showing deployment of the bag of the airbag device of the second embodiment of the present invention.
Figure 11:
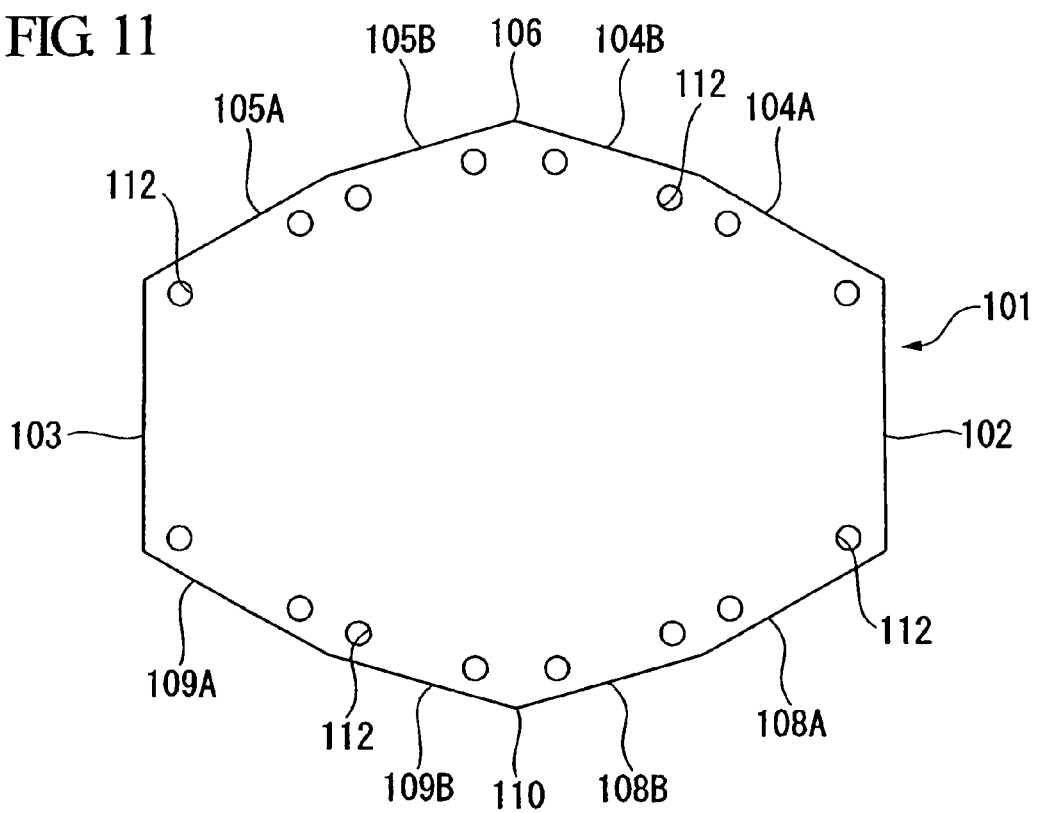
FIG. 11 is a plan view showing a modified example of the enveloping member of the airbag device of the second embodiment of the present invention.

The side of the edge portions 104, 105 of the enveloping member 101 is mounted, in a straight line, on the base plate portion 35. That is, as shown in FIG. 9, bolts are passed through mounting holes 41a to 41d arranged in a straight line on one side of the base plate portion 35, and nuts are screwed thereonto. Specifically, a bolt 63a is passed through mounting hole 41a and mounting hole 112a, and a nut 64a is screwed onto this bolt 63a. Also, a bolt 63b is passed through mounting hole 41b and mounting hole 112b, and a nut 64b is screwed onto this bolt 63b. Also, a bolt 63c is passed through mounting hole 41c and mounting hole 112c, and a nut 64c is screwed onto this bolt 63c. And, a bolt 63d is passed through mounting hole 41d and mounting hole 12d, and a nut 64d is screwed onto this bolt 63d. By this means, the edge portions 104, 105 on one side of the enveloping member 101 are mounted in a straight line on the base plate portion 35.

Also, the edge portions 108, 109 of the other side of the enveloping member 101 are mounted in a straight line on the base plate portion 35. That is, bolts are passed through mounting holes 41e to 41h arranged in a straight line on one side of the base plate portion 35, and nuts are screwed thereonto. Specifically, a bolt 63e is passed through mounting hole 41e and mounting hole 112e, and a nut 64e is screwed onto this bolt 63e. Also, a bolt 63f is passed through mounting hole 41f and mounting hole 112f, and a nut 64f is screwed onto this bolt 63f. Also, a bolt 63g is passed through mounting hole 41g and mounting hole 112g, and a nut 64g is screwed onto this bolt 63g. And, a bolt 63h is passed through mounting hole 41h and mounting hole 112h, and a nut 64h is screwed onto this bolt 63h. By this means, the edge portions 108, 109 on the other side of the enveloping member 101 are mounted in a straight line on the base plate portion 35.

In the airbag module 11 of the above second embodiment as well, similarly to the first embodiment, in the event of a vehicle collision, such as for example detection of gravitational acceleration equal to or above a prescribed value, or when other conditions for deployment are met, the inflator 44 is ignited. The bag 42 then causes the cover member 33 to be ruptured, and deploys while pressing the cover member 33 outwards, and presses the cushion pad 23 upward. The enveloping member 101 of the second embodiment forms a shape such that, as described above, the edge portions 102, 103 at both ends are shorter than the center portion connecting the vertex-angle portions 106, 110. Hence the peripheral lengths are different at the center portion and at both ends. Specifically, the peripheral length is shorter at both end portions than at the center portion. As a result, the bag 42 deploys such that the center portion is larger than both end portions.

Figure 8:
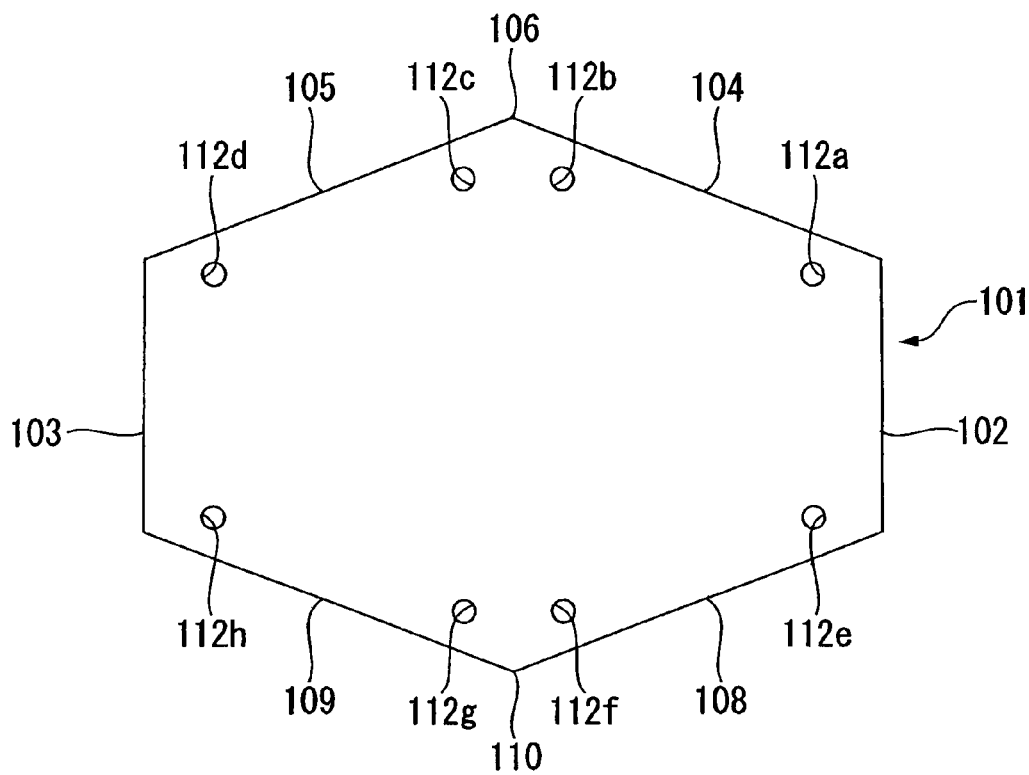
FIG. 8 is a plan view showing the enveloping member of the airbag device of a second embodiment of the present invention.

In the above-described second embodiment, as shown in FIG. 8, an example was explained in which one straight-line edge portion 104 is extended from one end of one edge portion 102 toward the vertex-angle portion 106, one straight-line edge portion 105 is extended from one end of another edge portion 103 toward the vertex-angle portion 106, one straight-line edge portion 108 is extended from the other end of the one edge portion 102 toward the vertex-angle portion 110, and one straight-line edge portion 109 is extended from the other end of the other edge portion 103 toward the vertex-angle portion 110. However, the invention is not limited to this constitution. For example, a constitution such as that shown in FIG. 11 may be employed. In this example, a plurality of (specifically, two) straight-line edge portions 104A, 104B are extended from one end of one edge portion 102 toward the vertex-angle portion 106, with the angle with the edge portion 102 decreased in steps. Also, a plurality of (specifically, two) straight-line edge portions 105A, 105B are extended from one end of another edge portion 103 toward the vertex-angle portion 106, with the angle with the edge portion 103 decreased in steps. A plurality of (specifically, two) straight-line edge portions 108A, 108B are extended from the other end of the one edge portion 102 toward the vertex-angle portion 110, with the angle with the edge portion 102 decreased in steps. And, a plurality of (specifically, two) straight-line edge portions 109A, 109B are extended from one end of another edge portion 103 toward the vertex-angle portion 110, with the angle with the edge portion 103 decreased in steps. In this case also, mounting holes 112 are formed on both sides of each of the edge portions 104A, 104B, 105A, 105B, 108A, 108B, 109A, 109B, are mounting holes are also formed, corresponding to these, in the base plate portion 35 of the case 51. By means of such a constitution, the bag 42 assumes a deployed shape such that the diameter is increased in a plurality of tapered steps from the end portions toward the center portion.

Figure 12:
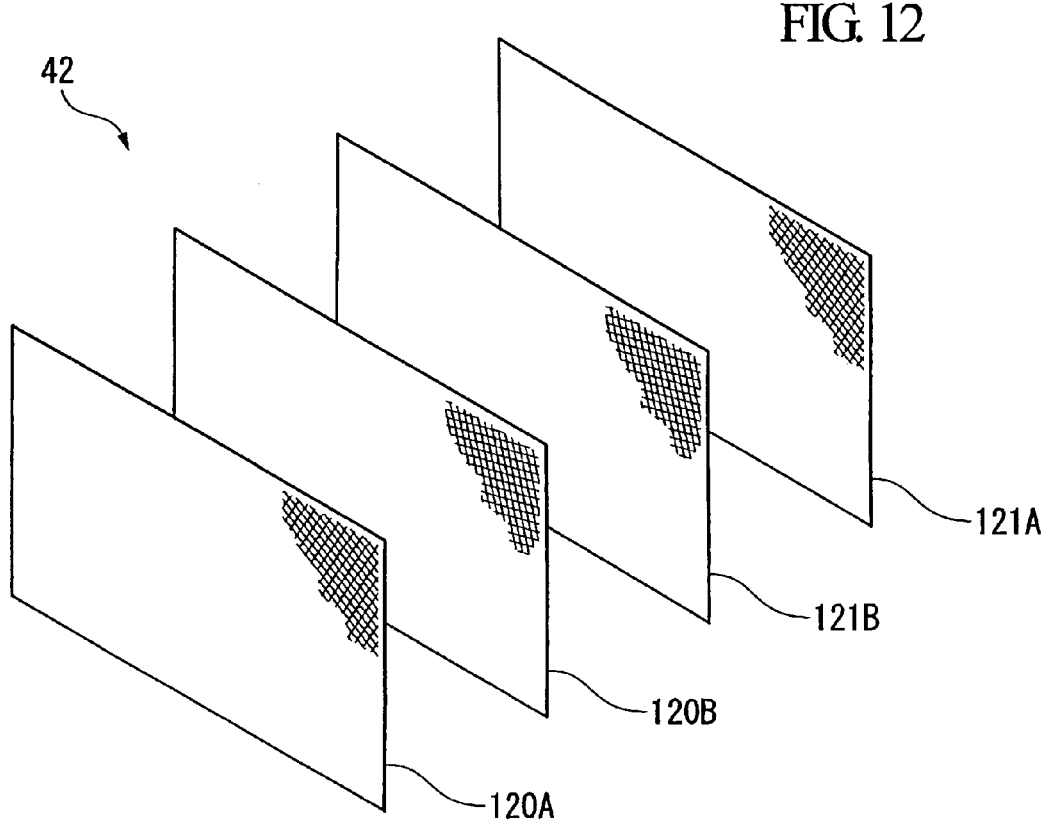
FIG. 12 is an exploded view showing in summary the constitution of the bag of the airbag devices of the first and second embodiments of the present invention.

In the first embodiment and second embodiment, the bag 42 is formed into a bag shape by stitching together the peripheral portions of the base cloth. Specifically, as shown in summary in FIG. 12, by stitching together the peripheral portions of a plurality each of front and rear base cloths, that is, a plurality of (specifically, two) front-side base cloths 120A, 120B and a plurality of (specifically, two) rear-side base cloths 121A, 121B, a bag shape is formed. At this time, the outside base cloth 120A and inside base cloth 120B comprised by the front side are stitched together in a state in which the respective weaving directions are different, and the outside base cloth 121A and inside base cloth 121B comprised by the rear side also are stitched together in a state in which the respective weaving directions are different. For example, the weaving directions of the outside base cloth 121A and inside base cloth 121B are shifted by 45°. That is, the bag 42 may be applied in various areas, and in some cases, strength (durability) equal to or greater than current cloths may be demanded, in the interest of shape stability or for other reasons. In such cases, rather than develop a new base cloth, by layering and using current base cloths, performance requirements can be satisfied cheaply and easily. However, if the weaving directions of all layered base cloths are the same, then in the event of deployment, stress tends to concentrate at the same stitched locations of the peripheral portions, and so it is effective to shift the weaving directions of the layered base cloths. Of course, the shift angle of 45° between weaving directions of the outside base cloth and the inside base cloth is only one example. An arbitrary angle may be set, such as for example one-half of this, or 22.5°, or another angle.

Figure 13A:
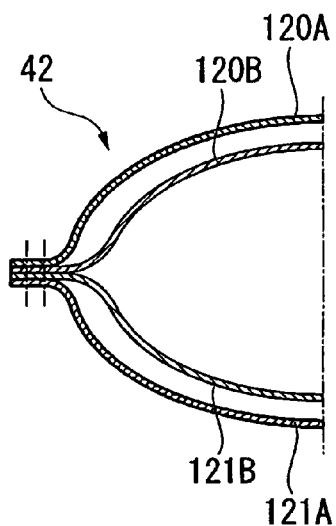
FIG. 13A and FIG. 13B are cross-sectional views showing the bags of the airbag devices of the first and second embodiments of the present invention.
Figure 13B:
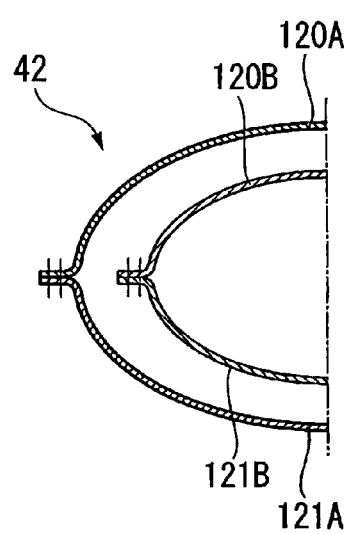

When stitching together the peripheral portions of the plurality of front-side base cloths 120A, 120B and the plurality of rear-side base cloths 121A, 121B, as shown in FIG. 13A, if all the base cloths 120A, 120B, 121A, 121B are layered and the peripheral portions are stitched together all at once (stitching locations are indicated by the double-dot-dash lines in FIGS. 13A and 13B), then the bag 42 can be formed cheaply and quickly. Or, the inside two base cloths 120B, 121B can be stitched together at the peripheral portions, and the two outside base cloths 120A, 121A can be stitched to these at the peripheral portions, as shown in FIG. 13B, to separately stitch together the inside and outside. In this way, formation into different shapes is possible. Of course, the bag 42 may comprise five or more base cloths, and in this case, the numbers of front and rear cloths may be different. Further, arbitrary modification of the shape is possible. And, a bag comprising a plurality of base cloths each in front and rear can be applied to other areas also, and the number and similar can be set arbitrarily. In addition, joining of the peripheral portions of base cloths may be performed, in addition to stitching, by bonding, weaving, or similar.

Third Embodiment

Next, the airbag device of a third embodiment of the present invention is explained below, referring to FIG. 14 through FIG. 17. In this embodiment also, an explanation is given primarily of points of difference with the above first embodiment. Hence constituent elements which are similar to those in the first embodiment are assigned the same symbols, and detailed explanations are omitted.

The airbag device of the third embodiment of the present invention is explained below, referring to the drawings.

Figure 14:
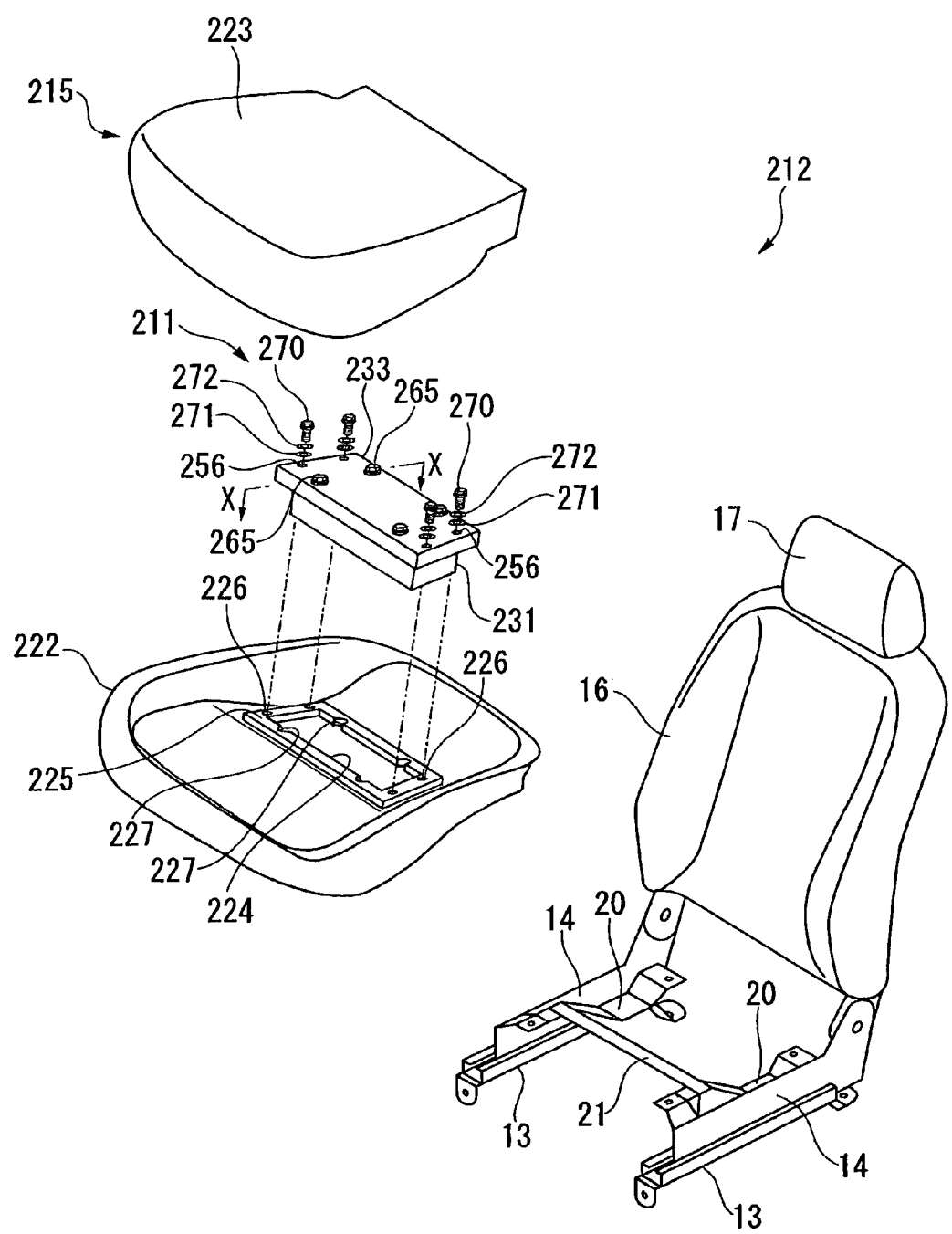
FIG. 14 is an exploded perspective view showing a seat to which the airbag device of a third embodiment of the present invention is applied.

FIG. 14 is an exploded perspective view showing, as the airbag device of the third embodiment, a seat 212 for a vehicle on which an airbag module 211 is mounted. This seat 212 has a pair of seat rails 13, extending in the back-and-forth direction of the vehicle, provided at a distance from each other in the vehicle width direction; sliders 14, slidably provided on each of the seat rails 13; a seat cushion 215, supported by the sliders 14, positioned substantially horizontally, to support primarily the posterior of the occupant; a seat back 16, provided rotatably on the rearward portion in the vehicle back-and-forth direction of the sliders 14, to support primarily the back of the occupant in the erect state; and, a headrest 17, provided on the side of the seat back 16 opposite the seat cushion 15, to support primarily the back of the head of the occupant.

The seat cushion 215 has pan brackets 20, each fixed to the inside of a slider 14; a connecting bracket 21, extending in the vehicle width direction so as to connect the right and left pan brackets 20; a seat pan 222, resting on the upper sides of both pan brackets 20 and fixed to both pan brackets 20; and a cushion pad (pad) 223, resting on the upper side of the seat pan 22 and supported by the seat pan 222. The occupant sits upon the cushion pad 223, which is formed by covering urethane foam with a membrane.

Figure 15:
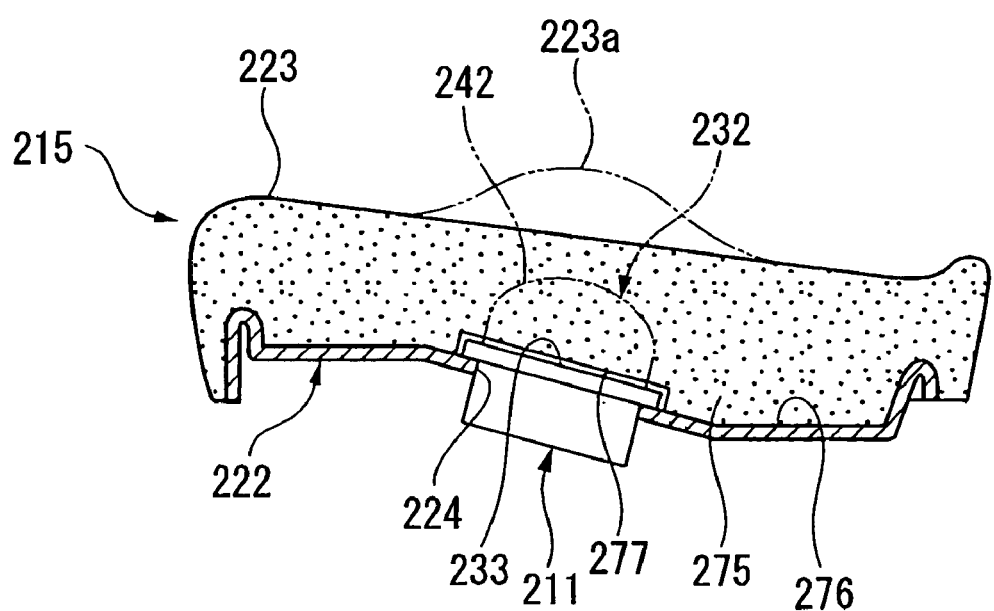
FIG. 15 is a side cross-sectional view showing the seat cushion of the seat to which the airbag device of the third embodiment of the present invention is applied.

As also shown in FIG. 15, the airbag module 211 of this embodiment is installed at a prescribed midpoint position on the seat pan 222 supporting the cushion pad 223 in the seat cushion 215. As a result, the airbag module 211 is positioned below the cushion pad 223 of the seat cushion 215. At the prescribed midpoint position of the seat pad 222, a mounting opening portion 224 for mounting of the airbag module 211 is formed. As shown in FIG. 14, a pedestal portion 225, which is a step higher than other outside portions, is formed on the peripheral portion of the mounting opening portion 224 of the seat pan 222. Mounting holes 226 and clearance grooves 227 for mounting of the airbag module 211 are formed in the pedestal portion 225.

Figure 16:
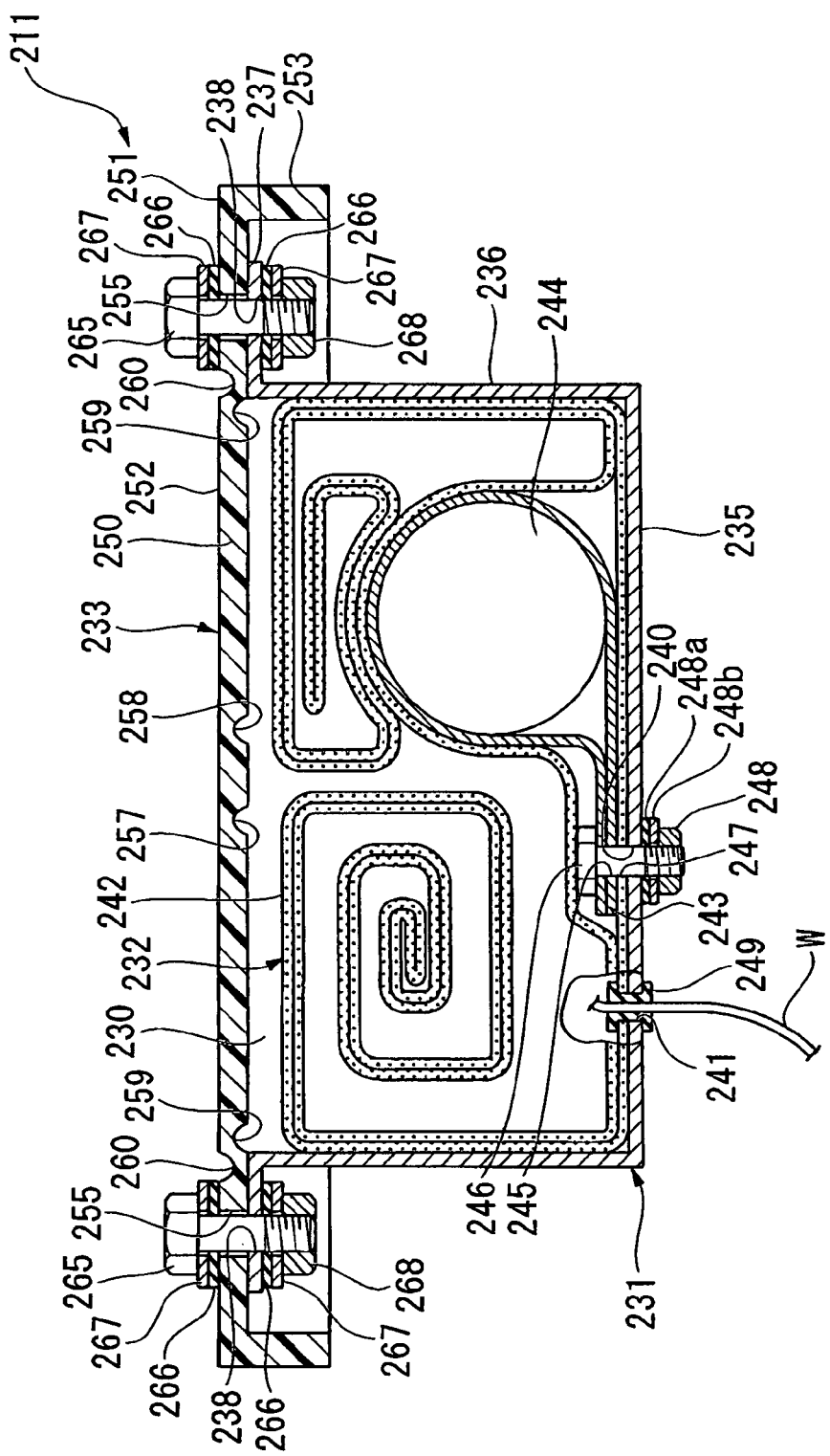
FIG. 16 is a view on arrow of the cross-section along line X-X in FIG. 14 of the airbag device of the third embodiment of the present invention.

As shown in FIG. 16, the airbag module 211 comprises a closed-bottom box-shape case 231 having an opening portion 230 in the upper portion; an airbag 232 accommodated, in a folded state, within this case 231; and a cover member 233 which covers the opening portion 230 of the case 231.

The case 231 is formed from a metal, and has a base plate portion 235, of substantially rectangular shape, longer in the transverse direction; a peripheral-wall portion 236, in a square-tube shape, standing erect from the entire periphery of the base plate portion 235; and a flange portion 237, extending outward from the entire periphery of the upper-end portion of the periphery-wall portion 236, and forming an opening peripheral portion. A plurality of mounting holes 238 for mounting the cover member 233 are formed in the flange portion 237. Also, a plurality of mounting holes 239 (shown in FIG. 17) for mounting on the seat pan 222 are formed. In the base plate portion 235 are formed a plurality of mounting holes 240 for mounting the airbag 232, and a passthrough hole 241 to pass through a wire W to the airbag 232 is also formed.

The airbag 232 has a bag-shape airbag main unit 242, and a substantially cylindrical inflator 244 which is able to introduce a gas (fluid) into the airbag main unit 242. The inflator 244 is positioned within the airbag main unit 242 in a state of being held by the mounting bracket 243. The mounting bracket 243 has a mounting bolt 246, fixed in place by welding or similar to the mounting hole 245. This mounting bolt 246, while inserted into the mounting hole 247 formed in the airbag main unit 242, is inserted into the mounting hole 240 in the base plate 235 of the case 231. On the tip thereof is screwed a nut 248, after providing a seal ring 248a and washer 248b, to mount the airbag 232 onto the case 231.

The wire W used to drive the inflator 244 of the airbag 232 is passed through the passthrough hole 241 and guided outside the case 231. The gap between the passthrough hole 241 and the wire W is sealed with for example a rubber sealing member 249. This sealing member 249 may be formed integrally with the wire W. The passthrough hole 241 can also be formed in the peripheral wall portion 236 of the case 231 to pass through the wire W. In this case also, the gap therebetween is similarly sealed with a sealing member. In FIG. 16, for convenience, the cross-sectional position of the mounting portion of the mounting bolt 246 is shown at a different cross-sectional position from the placement of the sealing member 249.

The cover member 233 is of a synthetic resin, and has a substantially plate-shape top-panel portion 252. This top-panel portion 252 has an intermediate cover member 250 which covers the opening portion 230 of the case 231, and an entire peripheral portion (peripheral portion) 251. The entire peripheral portion (peripheral portion) 251, when in a state in which the opening portion 230 of the case 231 is covered by the cover portion 250, is positioned outside the cover portion 250, that is, outside the opening portion 230. The entire peripheral portion 251 rests on the entire perimeter of the flange portion 237, and extends still further outward than the flange portion 237. The cover member 233 has a frame portion 253. This frame portion 253 is bent downward from the entire peripheral portion edge (the edge of the entire peripheral portion 251) of the top-panel portion 252 forming the edge of the cover member 233, substantially perpendicularly with respect to the top-panel portion 252. Here, the amount of extension of the entire peripheral portion 251 outside from the flange portion 237 is the amount by which the frame portion 253 is extended to a distance from the flange portion 253.

In the top-panel portion 252 are formed mounting holes 255, in positions corresponding to the mounting holes 238 of the flange portion 237 of the case 231. In the top-panel portion 252 are also formed mounting holes 256, in positions corresponding to the mounting holes 239 of the flange portion 237 shown in FIG. 17. And, in the top-panel portion 252, on the inner face on the side of the case 231 in the vicinity of the center as shown in FIG. 16, are formed, in parallel, a plurality of tear lines 257, 258 where the material is thin to promote rupture at the time of deployment of the airbag 232. In addition, a pair of bending lines 259 where the material is thin are formed in proximity to the border with the flange portion 237 of the case 231, in parallel with the tear lines 257, 258, to facilitate bending. A similar pair of bending lines 260 is formed on the outer face. In order to facilitate bending outward, the outer-face bending lines 260 are formed somewhat further outside than the inner-face bending lines 259 in proximity thereto.

The top-panel portion is fixed to the case 231 by bolts 265, pairs of rubber seal rings 266, pairs of washer rings 267, and nuts 268. The bolts 265 are passed through the plurality of mounting holes 255 in the top-panel portion 252 and the plurality of mounting holes 238 formed in the flange portion 237 of the case 231. In addition, bolts are passed through each of a pair of rubber seal rings 266 and a pair of washer rings 267. Nuts 268 are screwed onto each bolt 265.

That is, bolts 265 are inserted, in order from above, through washer rings 267, seal rings 266, mounting holes 255 in the cover member 233, mounting holes 238 in the case 231, seal rings 266, and washer rings 267, and are screwed into nuts 268. By this means, the cover member 233 is fixed to the case 231. At this time, by tightening the bolts 265 and nuts 268, the seal rings 266 on both sides are crushed, and the gaps on both sides between mounting holes 255, 238 and bolts 265 are sealed.

Figure 17:
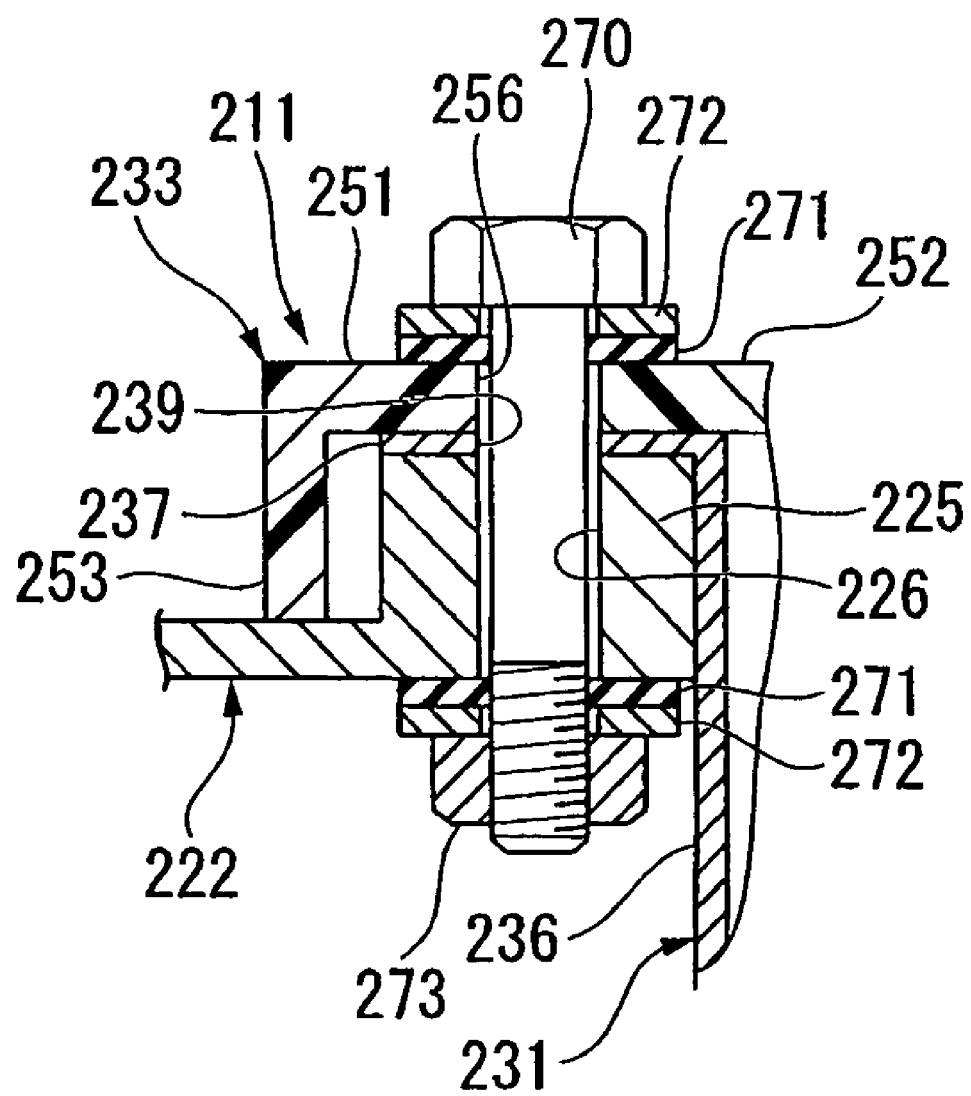
FIG. 17 is a partial enlarged cross-sectional view showing principal portions of the airbag device of the third embodiment of the present invention.

By thus mounting the cover member 233 onto the case 231 which accommodates the airbag 232, comprising an inflator 244, mounting bracket 243 and airbag main unit 242, the airbag module 211 is configured. This airbag module 211 is inserted from above into the mounting opening portion 224 of the seat pad 222 in the peripheral wall portion 236 of the case 231. Then, as shown in FIG. 17, the flange portion 237 of the case 231 is rested on the pedestal portion 225 of the peripheral portion of the mounting opening portion 224 of the seat pan 222. At this time, the bolts 265 and nuts 224 enter into the escape grooves 227 shown in FIG. 14. In this state, as shown in FIG. 17, the airbag module 211 is fixed to the seat pan 222 by the bolts 270, pairs of rubber seal rings 271, pairs of washer rings 272, and nuts 273, as shown in FIG. 17. That is, bolts 270 are inserted into the remaining plurality of mounting holes 256 in the cover member 233, the remaining plurality of mounting holes 239 in the case 231, and the mounting holes 226 formed in the pedestal portion 225. The pairs of rubber seal rings 271 and pairs of washer rings 272 are placed on each of the bolts 270. Nuts 273 are then screwed onto each of the bolts 270.

That is, bolts 270 are inserted, in order from above, through washer rings 272, seal rings 271, mounting holes 256 in the cover member 33, mounting holes 239 in the case 231, mounting holes 226 in the seat pan 222, seal rings 271, and washer rings 272, and nuts 273 are screwed thereonto. By this means, the airbag module 211 is fixed to the seat pan 222. At this time, by tightening the bolts 270 and nuts 273, the seal rings 271 on both sides are crushed, and the gaps on both sides between mounting holes 256, 226 and bolts 270 are sealed.

As shown in FIG. 15, the cushion pad 223 is mounted so as to cover from above the seat pan 222 onto which the airbag module 211 has been mounted. An accommodating depression portion 277 is formed in the lower face of the cushion pad 223, in order to accommodate the portion of the airbag module 211 protruding from the seat pan 222, that is, the cover member 233, in a state of contact with the peripheral portion 276 of the airbag module 211 outside the seat pan 222 in the peripheral-side peripheral portion 275.

In the above airbag module 211, when in the event of a vehicle collision, such as for example detection of gravitational acceleration equal to or above a prescribed value, or when other conditions for deployment are met, the inflator 244 is ignited. The bag 242, which had been in a folded state, then deploys due to gas generated by the inflator 244. That is, there is distension upward as indicated by the double-dot-dash line in FIG. 15, and the cushion pad 223 is pressed upward. Then the intermediate position of the cushion pad 223 is distended upward and a distended portion 223a is formed, so that the posterior of the occupant, seated in the seat 212 and with the seatbelt fastened, is checked from the front side, and forward motion of the pelvis is restrained. At the time of the above-described deployment, the cover member 233 is ruptured from the tear lines 257, 258, and the bending lines 259, 260 are bent on both sides, so that the airbag main unit 242 deploys while pressing the cover member 233 outward.

According to the above-described embodiment, the entire peripheral portion 251 of the top-panel portion 252 of the cover member 233 which covers the opening portion 230 in the upper portion of the case 231 accommodating the airbag 232 rests on the flange portion 237 comprised by the opening edge portion of the case 231. In addition, the frame portion 253 of the edge portion which extends further outward than this flange portion 237, and which is positioned on the outside of the flange portion 237, is bent downward. Hence liquid which has passed through the cushion pad 223 of the seat cushion 215 is stopped by the downward-bent framework portion 253, and so inundation of the gap between the case 231 and cover member 233 is impeded. Hence liquid which has passed through the cushion pad 223 of the seat cushion 215 is impeded from inundating up to the airbag 232.

The frame portion 253, bent downward from the entire peripheral portion of the cover member 233, is at a distance from the flange portion 237 of the case 231. Consequently, inundation of the gap between case 231 and cover member 233 can be reliably impeded. Hence inundation of the airbag 232 with liquid which has passed through the cushion pad 223 of the seat cushion 215 can be more reliably prevented.

In addition, a seal member 249 is provided which seals the gap between the wire W, guided through the passthrough hole 241 in the case 231, and the passthrough hole 241. Hence the passthrough hole 241, which can become an aperture for the passage of water due to steam and moisture from below, can be blocked.

Further, by tightening the bolts 265 and nuts 268, the gaps between the mounting holes 255, 238 and bolts 265, which are necessary to fix the cover member 233 to the case 231, are sealed by crushing the seal rings 266 on both sides. In addition, by tightening the bolts 270 and nuts 273, the gaps between the mounting holes 256, 226 and bolts 270 on both sides, which are necessary to fix the airbag module 211 to the seat pan 222, are sealed by crushing the seal rings 271 on both sides. Hence inundation of the gap between the case 231 and cover member 233 via these gaps is also impeded. Hence inundation of the airbag 232 with liquid which has passed through the cushion pad 223 of the seat cushion 215 can be more reliably prevented.

The frame portion 253 provided to prevent inundation may be bent downward relative to the top-panel portion 252. The frame portion 253 may be perpendicular to the top-panel portion 252 as described above, or may form an obtuse angle or an acute angle. Further, the angle made with the top-panel portion 252 may also be different for different portions.

In this third embodiment, an example was explained of a constitution in a case in which the enveloping member in the first embodiment and second embodiment is not provided; but of course an enveloping member may be provided.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An airbag device, provided below a pad of a seat cushion of a vehicle, comprising:
   an airbag, which deploys at a time of a vehicle collision; and
   an enveloping member, which envelops the airbag in a tube shape; wherein
   the airbag device is provided at a position substantially in a center of the seat cushion in a back-and-forth direction of the vehicle;
   the enveloping member has different peripheral lengths in an intermediate portion thereof and in end portions thereof; and
   the enveloping member has peripheral lengths which are longer in the end portions than in the intermediate portion.

2. An airbag device, provided below a pad of a seat cushion of a vehicle, comprising:
   an airbag, which deploys at a time of a vehicle collision;
   an enveloping member, which envelops the airbag in a tube shape;
   a case, having an opening portion in an upper portion, and which accommodates the airbag; and
   a cover member, which covers the opening portion of the case; wherein
   the airbag device is provided at a position substantially in a center of the seat cushion in a back-and-forth direction of the vehicle; and
   the enveloping member has different peripheral lengths in an intermediate portion thereof and in end portions thereof.

3. The airbag device according to claim 2, wherein
   a peripheral portion of the cover member is positioned on an opening peripheral portion of the opening portion of the case and extends further outward than the opening peripheral portion, and an edge portion of the cover member positioned on an outside of the opening peripheral portion is bent downward.

4. The airbag device according to claim 3, wherein
   the edge portion is remote from the opening peripheral portion.

* * * * *